United States Patent [19]
Garcia et al.

[11] Patent Number: 6,038,613
[45] Date of Patent: Mar. 14, 2000

[54] PREFETCHING AND STORING DEVICE WORK INFORMATION FROM MULTIPLE DATA STORAGE DEVICES

[75] Inventors: Enrique Q Garcia; Gregg Steven Lucas, both of Tucson, Ariz.; James Richard Pollock, San Jose, Calif.; Juan Antonio Yanes, Tucson, Ariz.

[73] Assignee: International Business Machines Corporation, Armonk, N.Y.

[21] Appl. No.: 08/971,085

[22] Filed: Nov. 14, 1997

[51] Int. Cl.[7] .................................................. G06F 13/00
[52] U.S. Cl. ........................... 710/1; 710/100; 710/113; 711/162; 712/11; 712/18
[58] Field of Search .............................. 395/821; 712/18, 712/11; 710/100, 1, 113, 128, 129; 711/162, 112, 113, 114, 148; 709/201, 251, 253

[56] References Cited

U.S. PATENT DOCUMENTS

| | | | |
|---|---|---|---|
| H696 | 10/1989 | Davidson | 364/900 |
| 4,313,161 | 1/1982 | Hardin et al. | 364/200 |
| 4,380,063 | 4/1983 | Janson et al. | 370/60 |
| 4,403,286 | 9/1983 | Fry et al. | 364/200 |
| 5,051,887 | 9/1991 | Berger et al. | 364/200 |
| 5,148,540 | 9/1992 | Beardsley et al. | 395/575 |
| 5,420,727 | 5/1995 | Basham et al. | 360/48 |
| 5,428,787 | 6/1995 | Pineau | 395/700 |
| 5,613,138 | 3/1997 | Kishi et al. | 395/800 |
| 5,619,728 | 4/1997 | Jones et al. | 395/847 |
| 5,787,459 | 12/1995 | Stallmo et al. | 711/112 |

*Primary Examiner*—Ayaz R. Sheikh
*Assistant Examiner*—Rupal D. Dharia
*Attorney, Agent, or Firm*—Robert M. Sullivan

[57] ABSTRACT

A device controller is described within a data storage system for pre-fetching device work information from multiple data storage devices, and accumulating the device work information to immediately respond to a subsequent device poll command from a storage controller. The device controller includes a device receiver to receive the device poll command, a device transmitter to transmit a response to the device poll command, a device information register for storing the pre-fetched device work information for each data storage device, and a sequencer for periodically pre-fetching the device work information from each data storage device. The sequencer pre-fetches such information by verifying that no device subsystem command from the storage controller is pending in the device receiver, then issuing a background poll command to a selected device to query the device for its device work information, and storing the device work information in the device information register. The device controller can then immediately respond to a subsequent device poll command issued from the storage controller by copying the device work information from the device information register to the device transmitter.

30 Claims, 3 Drawing Sheets

PREFETCHING AND STORING DEVICE WORK INFORMATION FROM MULTIPLE DATA STORAGE DEVICES

FIELD OF THE INVENTION

The present invention relates generally to device communications within data storage systems, and more particularly, to a method and system for pre-fetching device polling information from multiple data storage devices connected within the storage system. The present invention individually queries each data storage device to collect its device polling information, and accumulates such information to provide an immediate response to a subsequent system command requesting the device polling information.

BACKGROUND OF THE INVENTION

Data storage systems typically contain a central processing unit, or host processor, to manage the movement of information, or data, between different peripheral data storage devices. The host processor is often connected to the data storage devices through a storage controller. The storage controller and attached storage devices comprise a storage subsystem within the data storage system. The host processor typically executes control programs, or host applications, which generate data records to be stored on the data storage devices, and access data records previously stored on the data storage devices. The storage controller manages the data storage system, and directs the transfer of the data records between the host processor and the data storage devices.

The storage controller polls the attached data storage devices to obtain particular device information and device status. The storage controller typically issues a device poll command to a device controller. The device controller, in turn, communicates with either a single data storage device, or a set of data storage devices, to generate the requested information and respond to the storage controller. The device controller and the attached data storage devices are often referred to as a device subsystem.

The storage controller typically issues several types of poll commands to the device subsystem. A first type of poll command, referred to as special poll, is issued to determine a device type, and associated device characteristics, pertaining to a specific data storage device. Such device characteristics typically include data rate, transfer speed, and storage capacity, among other information. A second type of device poll command, referred to as summary poll, is issued to collect summary information from the data storage devices, such as the number of devices currently attached, and/or the number of devices currently available for selection, in the device subsystem. A third type of poll command, referred to as normal poll, is typically issued to a specific data storage device to obtain particular information regarding the device, such as a device address or whether the device has status to report.

The storage controller occasionally polls the device subsystem using the special poll command. Since the special poll command returns device characteristic information, the storage controller conducts this type of device poll when an event in the data storage system triggers a change in a particular device type or device configuration. On the other hand, the storage controller issues normal poll and summary poll commands at frequent time intervals as part of the standard operations in the data storage system. Normal poll and summary poll commands typically collect device work information from one or more attached data storage devices.

A data storage device indicates the presence of device work by raising a request, or interrupt, to the storage controller for certain reasons, such as: 1) the device has positioned itself at the correct location to satisfy a previous request for a data transfer; 2) the device has detected an error which needs to be reported; and 3) the device has undergone a status change where, for example, a previously varied-off device has been varied on.

A typical device polls sequence consists of the storage controller issuing the device poll command to the device subsystem. The device controller receives the poll command and queries those data storage devices necessary to generate an appropriate response to the poll command. When the device controller has obtained the necessary information, the device controller sends the response to the storage controller. In this scenario, the storage controller waits for the device controller to query the applicable devices, accumulate a response, and return such response. This delay affects the performance of the data storage system.

Recent improvements in the device poll sequence have reduced the delay in the normal poll and summary poll processes. An improved poll sequence allows the storage controller to issue the poll command to the device subsystem and not wait for the device controller to return with the appropriate response. Instead, the device controller acknowledges to the storage controller that it received the poll command. This acknowledgement allows the storage controller to continue processing additional tasks while waiting to receive the information requested with either the normal poll or summary poll command. The device controller then queries the data storage devices necessary to accumulate the appropriate response and sends a message to the storage controller once the collected information, and the corresponding response, are complete.

Allowing the storage controller to perform alternate tasks while waiting for the device poll response increases the data storage system performance, but still does not provide the best solution. The storage controller must still wait for a response to the normal poll and summary poll commands, and may need to suspend an alternate task when the requested device poll information is subsequently received. Suspending and resuming tasks in the storage controller introduces certain inefficiencies in the performance of the data storage system.

Accordingly, a method and apparatus are needed to further improve a device poll sequence within a data storage system. The present invention provides an immediate response to a storage controller when it issues a normal poll or summary poll command to a device subsystem. In the current embodiment, the device controller pre-fetches device work information for each attached data storage device and stores such information in a buffer. When the device controller receives a device poll command from the storage controller, it accesses the information corresponding to the requested devices from the buffer and returns an immediate response to the storage controller. The device controller contains a background task which operates at a low priority level, queries the attached data storage devices, and updates the device work information stored in the buffer.

SUMMARY OF THE INVENTION

An object of the present invention is to provide an improved method for polling data storage devices within a data storage system, such that an immediate response is presented to a storage controller when it issues a poll command to either a single device, or a set of devices, within the attached device subsystem.

Another object of the present invention is to provide an improved device controller for polling data storage devices within a data storage system, such that an immediate response is presented to a storage controller when it issues a poll command to either a single device, or a set of devices, within the attached device subsystem.

An embodiment of the present invention provides a method in a device controller for pre-fetching device work information from a plurality of data storage devices within a data storage system. The device controller receives device subsystem commands from a storage controller, the device subsystem commands including a device poll command. The method performs a background polling of the data storage devices during time intervals when no device subsystem command has been received from the storage controller. The method first verifies that no such command has been issued by the storage controller, and then selects a one of the data storage devices to perform a background poll. The method then queries the selected data storage device for its device work information, and awaits a response from the selected device. When the device work information is received from the selected device, the method stores the device work information in a device information register at an offset corresponding to the selected, or polled, device address. The device information register contains a data element corresponding to each attached data storage device.

Pre-fetching and storing the device work information for each data storage device allows the method to immediately respond to a subsequent device poll command. When the device controller receives a device poll command, the method uses the device address of the requested data storage device to be polled as an offset into the device information register to access the device work information. The method then immediately responds to the device poll command by copying the device work information to the storage controller. Additionally, the method interrupts the background polling of a data storage device, if the device controller receives a device subsystem command from the storage controller. When the device controller receives a device subsystem command, the method will abort waiting for the selected device to respond to the background poll, notify the selected device to discard the previous background poll command, and begin generating a response to the device subsystem command.

Another embodiment of the present invention provides a device controller to pre-fetch device work information from a plurality of data storage devices, accumulate the device work information, and immediately respond to a device poll command received from an attached storage controller. The device controller includes a device receiver, a device transmitter, a device information register, a drive command register, a drive data register, and a sequencer coupled therebetween. When no device command is pending from the storage controller, the sequencer performs a background poll operation of the data storage devices to pre-fetch their device work information. The sequencer issues a background poll command to a selected device through the drive command register. The device responds by transferring the device work information in the drive data register. The sequencer stores the device work information in the device information register. The device information register contains a data element for each data storage device.

When the device controller receives a device poll command, the sequencer reads the command and the requested device address from the device receiver. If a normal poll command is received, the sequencer copies the data element corresponding to the requested device address from the device information register to the device transmitter. The device work information for the requested device is then immediately transmitted to the storage controller. If a summary poll command is received, the sequencer copies a summary of data elements from the device information register to the device transmitter. This summary data element corresponds to a group of data elements pertaining to a group of device addresses of which the requested device address belongs. The summary device work information is then immediately transmitted to the storage controller.

The foregoing and other objects, features, and advantages of the invention will be apparent from the following more particular description of a preferred embodiment of the invention, as illustrated in the accompanying drawings.

DETAILED DESCRIPTION OF THE INVENTION

Figure 1:
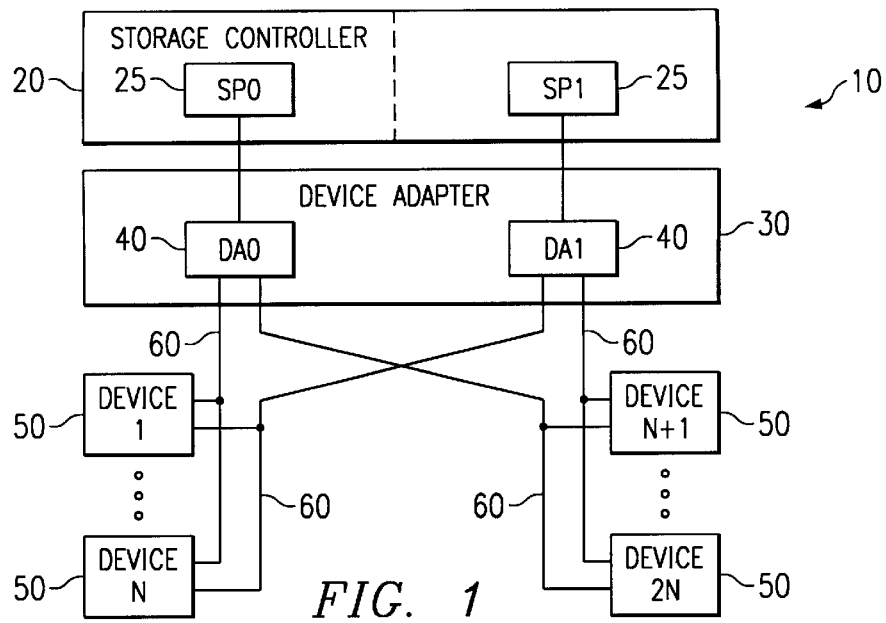
FIG. 1 is a block diagram showing an interconnection of functional components in a data storage system for providing an improved device poll sequence between a storage controller and an attached device subsystem, in accordance with the present invention.

Referring more particularly to the drawing, like numerals denote like features and structural elements in the various figures. The invention will be described as embodied in a typical data storage system. Turning to FIG. 1, a data storage system 10 is shown consisting of a storage controller 20, a device adapter 30, and a plurality of data storage devices 50. The storage controller 20 contains storage path processors 25 which connect the device adapter 30 through device controllers 40. Data links 60 couple the data storage devices 50 to the device controllers 40. A typical storage controller 30, such as an IBM 3990, directs data records within the data storage system. The block diagram does not show a host processor, which typically runs application programs that generate data records to be stored within the data storage system 10. The data storage devices, such as an IBM RAMAC or IBM 3390 storage device, provide permanent storage for the data records, and coupled with the device controllers 40 comprise a device subsystem within the data storage system 10.

The storage path processors 25 within the storage controller 20 typically comprise microprocessors running control instructions to manage and direct the data records within the device subsystem. The storage path processors 25 typically reside on separate power boundaries within the storage controller 20. Although not shown in the figure, the storage controller 20 also typically includes an interface to the host processor, an automatic data transfer (ADT) buffer for temporarily storing the data records, a data transfer component to interface to the device subsystem, and a cache memory to provide alternate storage of frequently accessed data records. In the current embodiment, each device controller 40 connects to every data storage device 50 within the device subsystem, providing each storage path processor 25 in the storage controller 20 access to all the devices 50. Providing access to every data storage device 50 and maintaining separate power boundaries allows the storage controller 20 to access every data record stored in the device subsystem through either storage path processor 25. Thus, a power failure in one storage path processor 25 does not prevent the other storage path processor 25 from accessing a requested data record.

As a part of managing the data records, the storage path processors 25 also issue the device poll commands to either an individual, or a set of, data storage devices 50 through the device controllers 40. The device controller 40 collects the necessary device information from the corresponding data storage devices 50 and provides a response for the device poll command to the interconnected storage path processor 25. As stated earlier, device poll commands are issued to determine a data storage device type, and its corresponding device characteristics, (special poll), to collect a summary of device status information from a set of data storage devices 50, (summary poll), and to obtain specific device status information regarding an individual data storage device 50, (normal poll). Device status information includes, among other things: 1) the device 50 has positioned itself at the correct location to satisfy a previous request for a data transfer; 2) the device 50 has detected an error which needs to be reported; and/or 3) the device 50 has undergone a status change where, for example, a previously varied-off device has been varied on.

Figure 2:
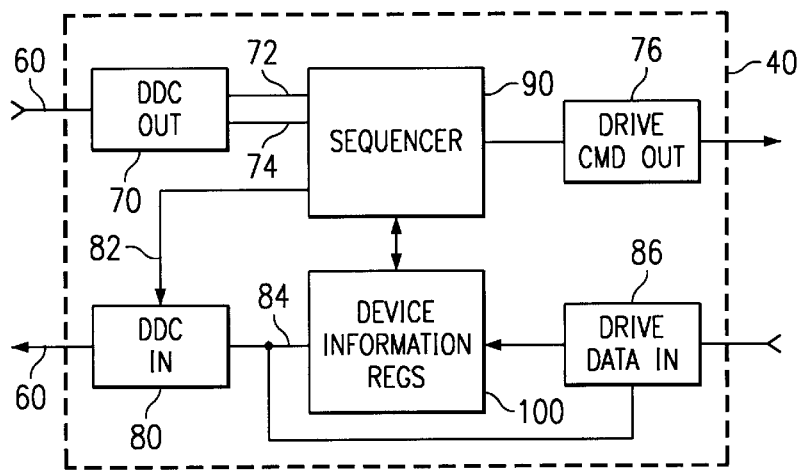
FIG. 2 is a block diagram showing in more detail a device controller within the data storage system of FIG. 1, in accordance with the present invention.

FIG. 2 shows a block diagram of the device controller 40 according to the present invention. The device controller 40 includes a sequencer 90, a group of device information registers 100, a director to device connection (DDC) interface from the data link 60, or a DDC-out register 70, a DDC interface into the data link, or a DDC-in register 80, a drive command register 76, and a drive data register 86. The sequencer 90 is interconnected to the device information registers 100, the DDC-out register 70, the DDC-in register 80, and the drive command register 76. The sequencer 90 executes control instructions to direct the operations within the device controller 40. The device information registers 100 contain data elements corresponding to each data storage device 50 connected to the device controller 40. A data element maintains device status, or device work, information pertaining to each data storage device 50.

The DDC-out register 70 receives data and command information from the storage path processor 25 through the data link 60, separates the data signals 72 from the command signals 74, and couples the data 72 and command 74 signals to the inputs of the sequencer 90. In addition, the DDC-in register 80 receives control information 82 from the sequencer 90 and data from either the device information registers 100 or the drive data register 86. The DDC-in register 80 combines the data 84 and control information 82 and transmits it along the data link 60 to the storage path processor 25. The drive command register 76 receives device commands from the sequencer 90 and transmits such commands to the selected data storage device 50. The drive data register 86 receives responses to the device commands from the selected data storage device 50 and transfers such responses to either the device information registers 100 or the data input 84 to the DDC-in register 80.

When the device controller 40 receives a non-poll command from the storage path processor 25, the data and command information are latched in the DDC-out register 70 and transferred to the sequencer 90. Control instructions executing within the sequencer 90 translate the command received from the storage path processor 25 into a device command, and direct the non-poll device command to the drive command register 76. The drive command register 76 forwards the command to the corresponding data storage device 50. The command is typically transmitted to the selected device 50, but in the case of device selection command, the command is transmitted to the data storage device 50 corresponding to the device address sent with the command. The device response is returned in the drive data register 86, and forwarded to the data input 84 of the DDC-in register 80. The sequencer 90 provides any necessary control commands to the control signal 82 input of the DDC-in register 80, and the data and control information is transmitted along the data link 60 to the storage path processor 25.

Additionally, when the device controller 40 receives a device poll command from the storage path processor 25, the data and command information are again latched in the DDC-out register 70 and transferred to the sequencer 90. Control instructions executing with in the sequencer 90 determine whether the device poll command is a summary poll or normal poll command. The sequencer 90 points to the data element in the device information registers corresponding to the selected device, or set of devices, in the device poll command. The data element is copied to the data input 84 of the DDC-in register 80, and the sequencer 90 provides the appropriate command response to the device poll command a t the control signal input 82 to the DDC-in register 80. As with a non-poll command, the data and control information is transmitted along the data link 60 to the storage path processor 25.

Alternatively, when the device controller 40 receives no command from the storage path processor 25, the sequencer 90 conducts a background polling to query the data storage devices 50 for device work, a nd device status, information. The sequencer 90 selects the ad dress of the next device 50 for which to poll, loads a device background poll command into the drive command register 76, and points to the appropriate data element within the data information registers 100. The drive command register 76 transmits the poll command to the addressed device 50. The response to the poll command is then returned in the drive data register 86, and stored in the selected data element within the device information registers 100. The background polling program within the sequencer 90 then determines whether the device controller 40 has received a command from the storage path processor 25. If still no command has arrived, the control program repeats its pre-fetching of device work, or device status, information by selecting a next data storage device address from a device queue.

Figure 3:
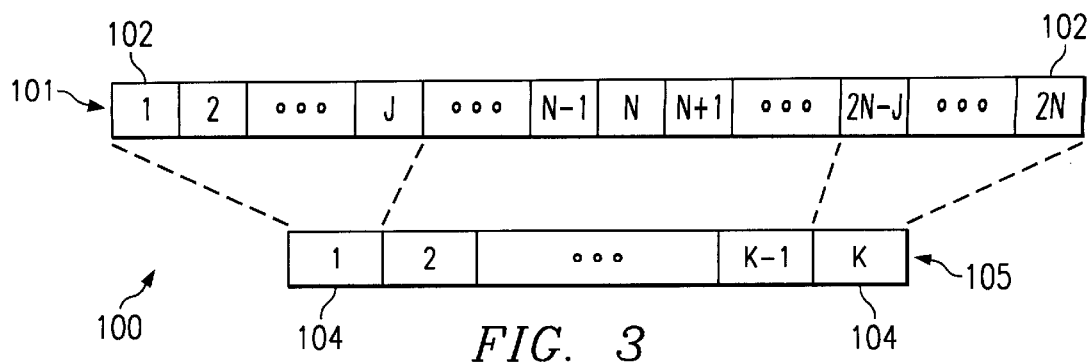
FIG. 3 is a block diagram representing the device information registers included within the device controller of FIG. 2, in accordance with the present invention.

FIG. 3 shows a block diagram representing the device information registers 100. In the current embodiment, two groups of registers are included: the device registers 101 and the device summary registers 105. The device registers 101 contain a data element 102 corresponding to each data storage device 50 attached to the device controller 40. The data element 102 indicates whether the corresponding data storage device 50 has device work, or device status, to report to the storage controller 20. The device controller 40 updates each data element 102 when pre-fetching device poll information from the attached devices 50, and uses the corresponding data element 102 to immediately respond to a normal poll command issued from the storage path processor 25 to an individual device 50.

The device summary registers 105 contain a data element 104 corresponding to a set of data storage devices 50 attached to the device controller 40. This data element 104 indicates whether any of the corresponding set of devices 50 have device work, or device status, to report to the storage controller 20. Thus, the device controller 40 maintains this summary data element 105 when it updates any one of the data elements 104 corresponding to a data storage device 50 queried by the device controller 40 during its device poll pre-fetching operation. The device controller 40 then uses one or more of the summary data elements 105 to respond to a summary poll command issued from the storage path processor 25, depending on which set of devices 50 relate to the issued poll command.

In the current embodiment, a device controller 40 may connect to a maximum of one hundred twenty-eight (128) data storage devices 50. Accordingly, the device registers 101 contain 128 data elements 102, one for each attachable device 50. The device summary registers 105 additionally contain eight data elements 104, one for each set of sixteen attachable devices 50. One ordinarily skilled in the art recognizes that increasing the number of summary data elements 104 in the device summary registers 105 decreases the number of devices pertaining to each summary data element 104, for a fixed number of devices 50 attached to the device controller 40. As an example, having sixteen summary data elements 104 reduces to eight the number of devices represented by each data element, assuming the device controller still attaches to 128 devices 50. In addition, the current embodiment uses a single bit to represent each data element 102 in the device registers 101 and each summary data element 104 in the device summary registers 105, and performs a logical OR of the corresponding data elements 102 to determine the associated summary data element 104. One ordinarily skilled in the art also recognizes that more than one bit may be used to represent the data elements 102 and the summary data elements 104.

Figure 4:
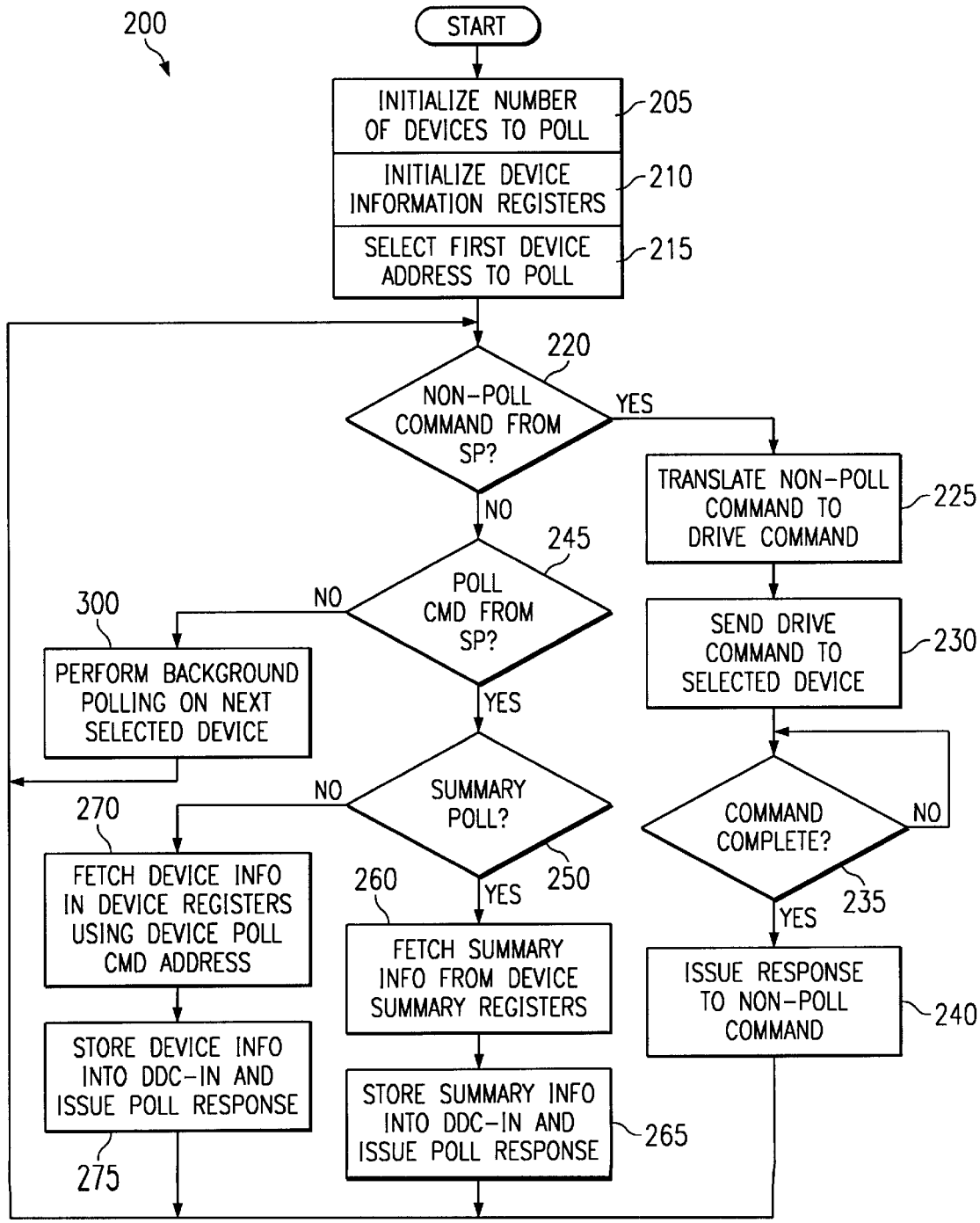
FIGS. 4 and 5 show a flow diagram depicting an illustrative sequence of operational steps used to provide an improved device poll sequence, according to the present invention.
Figure 5:
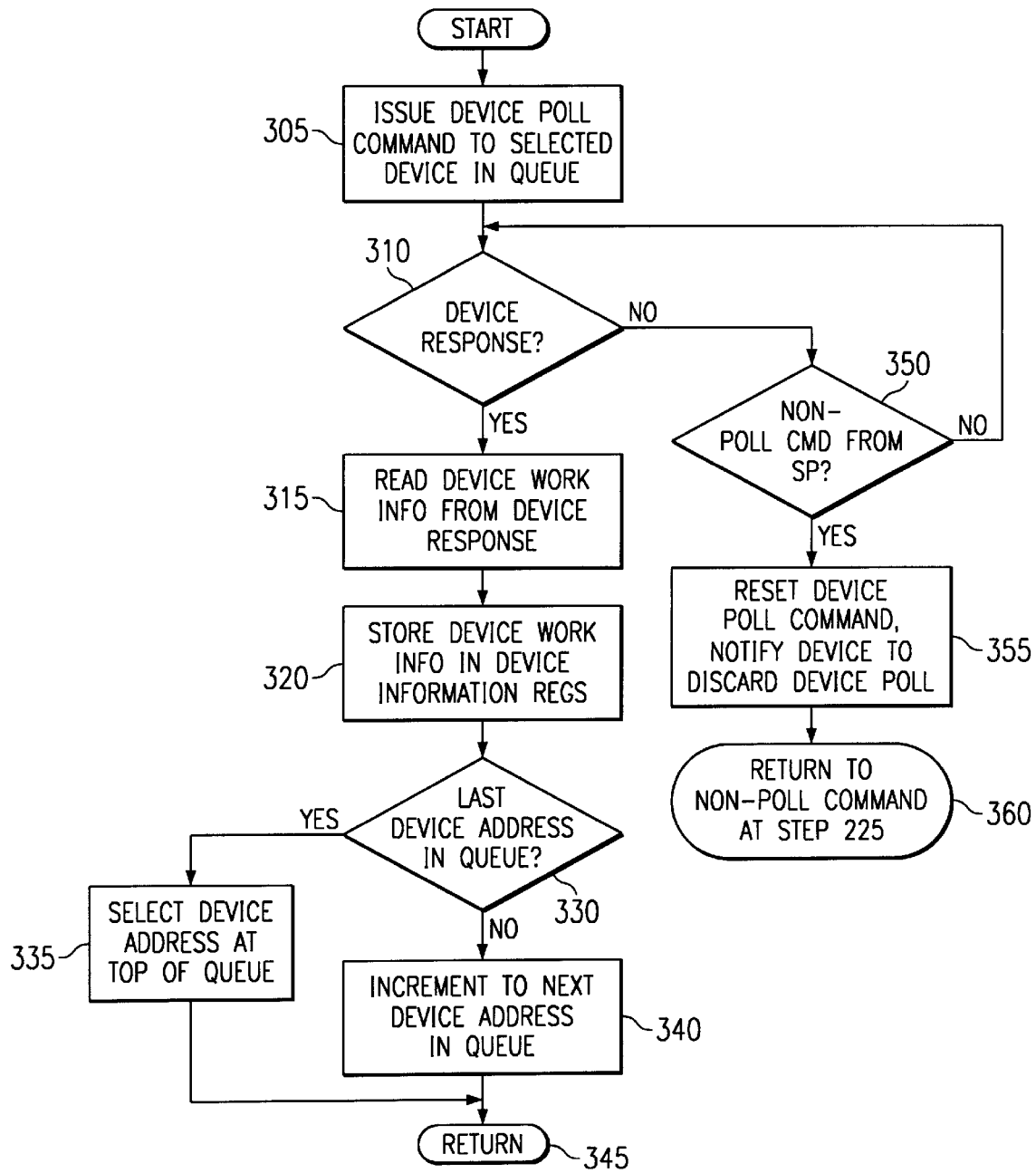

FIGS. 4 and 5 describe a method, within a device controller 40, for pre-fetching device work, or device status, information and storing such information, such that an immediate response can be provided to a subsequent device poll command issued from an interconnected storage path processor 25 within a storage controller 20. In the current embodiment, the sequencer 90 executes control instructions which perform the method steps described herein. One ordinarily skilled in the art recognizes that the sequencer 90 of the current embodiment need not be used, but alternate hardware or software components could be used to perform the method. FIG. 4 describes a method 200, within the device controller 40, for responding to non-poll commands issued from the storage controller 20, and for performing a background poll of the attached data storage devices 50. A method step 205 queries the device subsystem to determine the number of attached devices 50 to be polled for device work, or device status, information. A step 210 initializes the device information registers 100 by resetting the data elements 102 in the device registers 101 and the summary data elements 104 in the device summary registers 105. A step 215 initializes a selected device address, to be used for background polling of the devices 50, to the first data storage device 50.

A step 220 determines whether a non-poll command has been received from the storage path processor 25 and awaits processing in the DDC-out register 70. If so, a step 225 translates the non-poll command issued from the storage path processor 25 into a drive command to be transmitted to the selected device 50. In the event the non-poll command is a device selection command, step 225 uses the device address sent from the storage path processor 25 to select the addressed device 50. A step 230 loads the drive command into the drive command register 76 and transmits the drive command to the appropriate data storage device 50. A step 235 determines whether the drive command has completed by monitoring the drive data register 86 for a device response. When a response is received, a step 240 returns a response to the storage path processor 25 by moving the drive response to the data inputs 84 of the DDC-in register 80 and setting an appropriate command response on the control signal inputs 82 of the DDC-in register 80. The method 200 then continues at step 220 to check whether another command was received from the storage path processor 25.

If a non-poll command has not been received, a step 245 determines whether the storage path processor 25 issued a device poll command. If so, a step 250 determines whether the device poll command is a summary poll or a normal poll command. It should be noted that the method described herein pre-fetches device information needed only to respond to either a summary poll or a normal poll command. The device controller 40 typically need not query the attached devices to respond to a special poll command, since the device characteristic information is typically maintained within the device controller 40. If a summary poll command was received, a step 260 queries the device summary registers 105 for the summary data element 104, or elements 104, containing the device work, or device status, information for the requested set of devices 50. A step 265 stores the summary data element(s) 104 in the data inputs 84, and sets an appropriate command response on the control signal inputs 82, of the DDC-in register 80.

If step 250 determines that a normal poll command was received from the storage path processor 25, a step 270 queries the device registers 101 for the data element 102 containing the device work, or device status, information for the requested devices 50. A step 275 stores the data element 102 in the data inputs 84, and sets an appropriate command response on the control signal inputs 82, of the DDC-in register 80. Once the device poll response is transmitted to the storage path processor 25, the selected data element 102 is reset to indicate that the storage path processor 25 has received the corresponding device work information. Accordingly, the corresponding summary data element 104 is recomputed using the newly reset data element 102. If step 245 determined that neither a non-poll or poll command had been received from the storage path processor 25, a step 300 performs a background polling of the next device 50 in the queue to pre-fetch device work, or device status, information into the device information registers 100. The method then continues at step 220 to again check whether the storage path processor 25 has issued a command to the device controller 40.

FIG. 5 describes a method 300, in the device controller 40, for performing background polling to the attached devices 50 to pre-fetch device work, or device status, information. As stated earlier, the sequencer 90 executes control instructions, in the current embodiment, to perform the method described herein. Again, an ordinarily skilled artisan recognizes that the sequencer 90 need not be used, but alternate hardware and software components could be used to perform the described method. A step 305 fetches a device address from a device poll queue which denotes the next device 50 to be polled, and issues a device background poll command to the addressed device 50 using the drive command register 76.

A step 310 determines whether the addressed device 50 has responded to the background poll command by monitoring the drive data register 86. If the addressed device 50 has not responded to the device background poll command, a step 350 determines whether the device controller 40 has received a non-poll command from the storage path processor 25. If not, steps 310 and 350 again wait for either a response to the background poll command, or a new, non-poll device subsystem command from the storage path processor 25. Otherwise if a new, non-poll command was received from the storage path processor 25, a step 355 interrupts the background poll routine 300. The background poll command is reset from the drive command register 76, and a command to discard the background poll command is issued to the attached device 50. A step 360 then returns to step 225 to process non-poll commands from the storage path processor 25.

A step 315 reads the poll response, including the device work, or device status, information, from the drive data register 86, when the addressed device 50 responds to the device background poll command. A step 320 stores the device work information into the device information registers 100. The device address provides an offset into the device registers 101, and the corresponding data element 102 is updated with the device work information. In addition, the summary data element 104 in the device summary registers 105, corresponding to the set of devices which includes the addressed device 50, is updated according t o this device work information. As previously described, the current embodiment performs a logical OR operation of a set of data elements 102 to generate the corresponding summary data element 104. This set of data elements 102 represents the device work information for the corresponding set of devices 50.

A step 330 determines whether the current device address is the last device address in the device poll queue. If not, a step 340 increments to the next device address in the queue and saves that address as the selected device address for the next background polling operation. Otherwise if the end of the queue has been reached, a step 335 selects the device address at the top of the queue and saves it as the selected device address for the next background polling operation. The method 300 uses a circular queue of device addresses to ensure that background polling of all the attached devices 50, for their device work information, is completed in a timely, and consistent, manner. A step 345 returns from the background polling routine 300 to check whether the device controller 40 has received a new command from the storage path processor 25. Thus, when the background polling routine 300 is next invoked, the device poll queue indicates the next attached device 50 from which to pre-fetch device work information.

While the invention has been particularly shown and described with reference to preferred embodiments thereof, it will be understood by those skilled in the art that various changes in form and details may be made therein without departing from the spirit and scope of the invention.

What is claimed is:

1. A device controller in a data storage system for pre-fetching device work information from each of a plurality of data storage devices, said device controller coupled to a storage path processor within a storage controller and further coupled to said plurality of data storage devices, said device controller comprising:

a data receiver coupled to said storage path processor for receiving device subsystem commands, including a device poll command;

a data transmitter coupled to said storage path processor for transmitting responses to said device subsystem commands, including said device work information;

a device information register for storing said device work information from each said data storage device; and a sequencer coupled to said data receiver, said data transmitter, and said device information register, said sequencer fetching said device subsystem commands from said data receiver, said sequencer storing said responses to said device subsystem commands in said data transmitter, said sequencer further pre-fetching said device work information from said each data storage device before said storage path processor issues said device poll command, thereby immediately providing said device work information to said storage path processor when said device poll command is subsequently received.

2. The device controller in claim 1 further comprising:

a drive command register coupled to said sequencer for transmitting a device background poll command to said each data storage device for pre-fetching said device work information; and a drive data register coupled to said sequencer, said data transmitter, and said device information register, for receiving said device work information from said each data storage device in response to said device background poll command.

3. The device controller in claim 1 wherein said device information register further comprises:

a device register having a plurality of data elements, each data element corresponding to said each data storage device and for storing said device work information pertaining to said data storage device; and a device summary register having a plurality of summary data elements, each summary data element corresponding to a subset of said plurality of data storage devices and for storing a summary of said device work information pertaining to said subset of data storage devices.

4. The device controller in claim 3 wherein said each summary data element is computed by performing a logical OR operation on a group of said data elements in said device register, said group of said data elements corresponding to said subset of said plurality of data storage devices.

5. The device controller in claim 2 wherein said sequencer assigns a highest priority to non-poll device subsystem commands, translates said non-poll device subsystem commands into device commands, issues said device commands through said drive command register to said each data storage device, monitors said drive data register for said device responses, and transfers said device responses to said data transmitter.

6. The device controller in claim 4 wherein said sequencer pre-fetches said device work information from said each data storage device by:

reading said data receiver to verify that said storage path processor has not currently issued said non-poll device subsystem command;

issuing said device background poll command through said drive command register to query a polled data storage device for said device work information;

monitoring said drive data register for said device work information; and storing said device work information in said device register at said data element corresponding to said polled data storage device.

7. The device controller in claim 6 wherein said sequencer updates said device summary register at said summary data element corresponding to said subset of data storage device which includes said polled data storage device.

8. The device controller in claim 7 wherein said sequencer responds to said device poll command by:
   reading a normal device poll command and a requested device address from said device receiver;
   selecting said data element from said device register corresponding to said requested device address; and
   copying said device work information from said data element to said device transmitter, said device transmitter transmitting said device work information to said storage path processor.

9. The device controller in claim 8 wherein said sequencer resets said device work information in said data element, and updates said summary data element, corresponding to said requested device address, once said device work information has been transmitted to said storage path processor.

10. The device controller in claim 7 wherein said sequencer responds to said device poll command by:
    reading a summary device poll command and a requested group of device addresses from said device receiver;
    selecting said summary data element from said device summary register corresponding to said requested group of device addresses; and
    copying said device work information from said summary data element to said device transmitter, said device transmitter transmitting said device work information to said storage path processor.

11. A method in a device controller for pre-fetching device work information from each of a plurality of data storage devices in a data storage system, said device controller coupled between a storage path processor and said plurality of data storage devices, said device controller receiving device subsystem commands from said storage path processor and accessing said data storage devices to respond to said device subsystem commands, said method comprising steps of:
    (a) verifying that said storage path processor has not currently issued said device subsystem command;
    (b) selecting a polled data storage device from said plurality of data storage devices;
    (c) querying said polled data storage device for said device work information;
    (d) receiving said device work information from said polled data storage device; and
    (e) storing said device work information in a device information register, said device information register having a plurality of data elements, each data element corresponding to each data storage device.

12. The method in claim 11 wherein said step (a) further comprises:
    reading a device receiver to verify that said device subsystem command has not been received from said storage path processor, said device receiver coupled to said storage path processor.

13. The method in claim 11 wherein said step (c) further comprises:
    issuing a device background poll command through a drive command register to query said polled data storage device for said device work information, said drive command register for issuing commands to said plurality of data storage devices.

14. The method in claim 11 wherein said step (d) further comprises:
    monitoring a drive data register for said device work information, said drive data register for receiving data from said plurality of data storage devices.

15. The method in claim 11 wherein said device information register further comprises:
    a device register having a plurality of data elements, each data element corresponding to said each data storage device and for storing said device work information pertaining to said data storage device; and
    a device summary register having a plurality of summary data elements, each summary data element corresponding to a subset of said plurality of data storage devices and for storing a summary of said device work information pertaining to said subset of data storage devices.

16. The method in claim 15 wherein said step (e) further comprises:
    storing said device work information in said device register at said data element corresponding to said polled data storage device; and
    updating said summary data element in said summary data register using said device work information in said data element.

17. The method in claim 16 wherein said each summary data element is computed by performing a logical OR operation on a group of said data elements in said device register, said group of said data elements corresponding to said subset of said plurality of data storage devices.

18. The method in claim 11 further comprising:
    (f) if a device poll command is issued by said storage path processor, immediately responding to said device poll command by copying said device work information for said requested data storage device from said device information registers to said storage path processor.

19. The method in claim 18 wherein step (f) further comprises:
    reading a normal device poll command and a requested device address from said device receiver;
    selecting said data element from said device register corresponding to said requested device address; and
    copying said device work information from said data element to a device transmitter, said device transmitter coupled to said storage processor and transmitting said device work information to said storage path processor.

20. The method in claim 18 further comprising:
    (g) resetting said device work information in said device information register corresponding to said requested data storage device, once said device work information has been transmitted to said storage path processor.

21. The method in claim 20 wherein said step (g) further comprises:
    resetting said device work information in said data element, corresponding to said requested device address, in said device register; and
    updating said summary data element, corresponding to said requested device address, in said summary device register.

22. The method in claim 18 wherein step (f) further comprises:
    reading a summary device poll command and a requested group of device addresses from said device receiver;
    selecting said summary data element from said device summary register corresponding to said requested group of device addresses; and
    copying said device work information from said summary data element to said device transmitter, said device transmitter coupled to said storage path processor and transmitting said device work information to said storage path processor.

23. A data storage system comprising:

a plurality of data storage devices for storing data records, each data storage device generating device work information;

a storage controller for managing said data records stored on said plurality of data storage devices, said storage controller issuing device subsystem commands, including a device poll command, and receiving responses to said device subsystem commands, including device work information in response to said device poll command; and a device controller coupled between said storage controller and said data storage device for directing said data records between said storage controller and said plurality of data storage devices, said device controller receiving said device subsystem commands and generating said responses to said device subsystem commands, said device controller further pre-fetching said device work information from said each data storage device before said storage controller issues said device poll command, thereby providing an immediate response to said storage controller when said device poll command is subsequently received.

24. The data storage system in claim 23 wherein said storage controller further comprises:

a storage path processor coupled to said device controller for issuing said device poll command and receiving said device work information in response to said device poll command.

25. The data storage system in claim 24 wherein said device controller further comprises:

a data receiver for receiving said data records and device subsystem commands, including said device poll command, from said storage path processor;

a data transmitter for transmitting said data records and said responses to said device subsystem commands, including said device work information, to said storage path processor;

a device information register for storing said device work information from each said data storage device; and a sequencer coupled to said data receiver, said data transmitter, and said device information register, said sequencer fetching said received data records and said device subsystem commands from said data receiver, said sequencer storing said transmitted data records and said responses to said device subsystem commands in said data transmitter, said sequencer further loading said device work information in said device information register into said data transmitter when responding to said device poll command.

26. The data storage system in claim 25 wherein said device controller further comprises:

a drive command register coupled to said sequencer for transmitting device commands to said each data storage device; and a drive data register coupled to said sequencer, said data transmitter, and said device information register, for receiving device responses from said each data storage device, including data records stored on said each data storage device and device work information contained within said each data storage device, wherein said sequencer translates said device subsystem commands into said device commands, issues said device commands through said drive command register to said each data storage device, monitors said drive data register for said device responses, and transfers said device responses to said data transmitter.

27. The data storage system in claim 25 wherein said device information register further comprises:

a device register having a plurality of data elements, each data element corresponding to said each data storage device and for storing said device work information pertaining to said data storage device; and a device summary register having a plurality of summary data elements, each summary data element corresponding to a subset of said plurality of data storage devices and for storing a summary of said device work information pertaining to said subset of data storage devices.

28. The data storage system in claim 27 wherein said each summary data element is computed by performing a logical OR operation on a group of said data elements in said device register, said group of said data elements corresponding to said subset of said plurality of data storage devices.

29. The data storage system in claim 27 wherein said sequencer pre-fetches said device work information from said each data storage device by:

verifying that said storage controller has not currently issued a device subsystem command by reading said data receiver;

issuing said device command through said drive command register to query a polled data storage device for said device work information;

monitoring said drive data register for said device work information; and storing said device work information in said device register at said data element corresponding to said polled data storage device.

30. The data storage system in claim 29 wherein said sequencer updates said device summary register at said summary data element corresponding to said subset of data storage device which includes said polled data storage device.

* * * * *